UNITED STATES PATENT OFFICE.

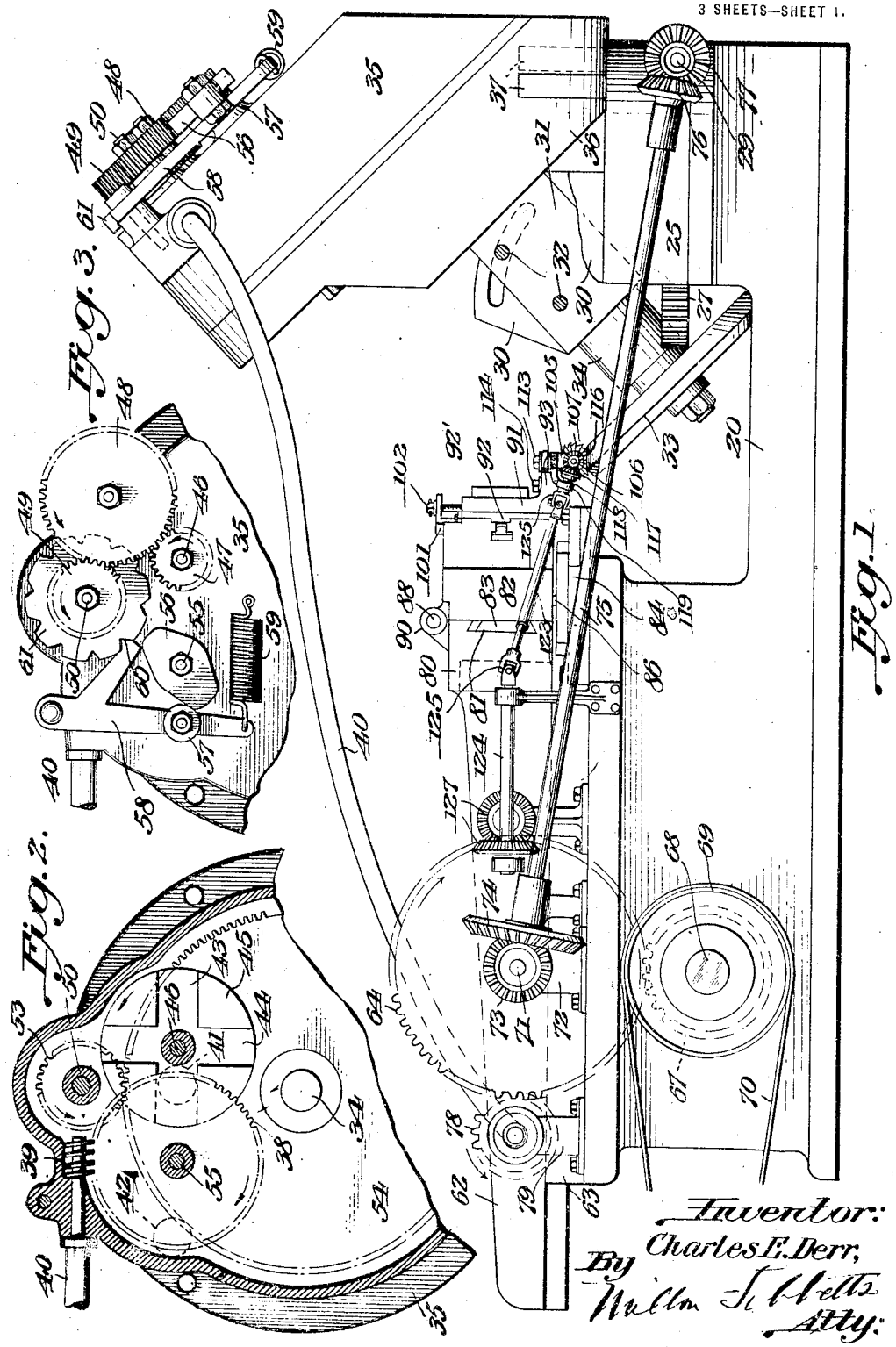

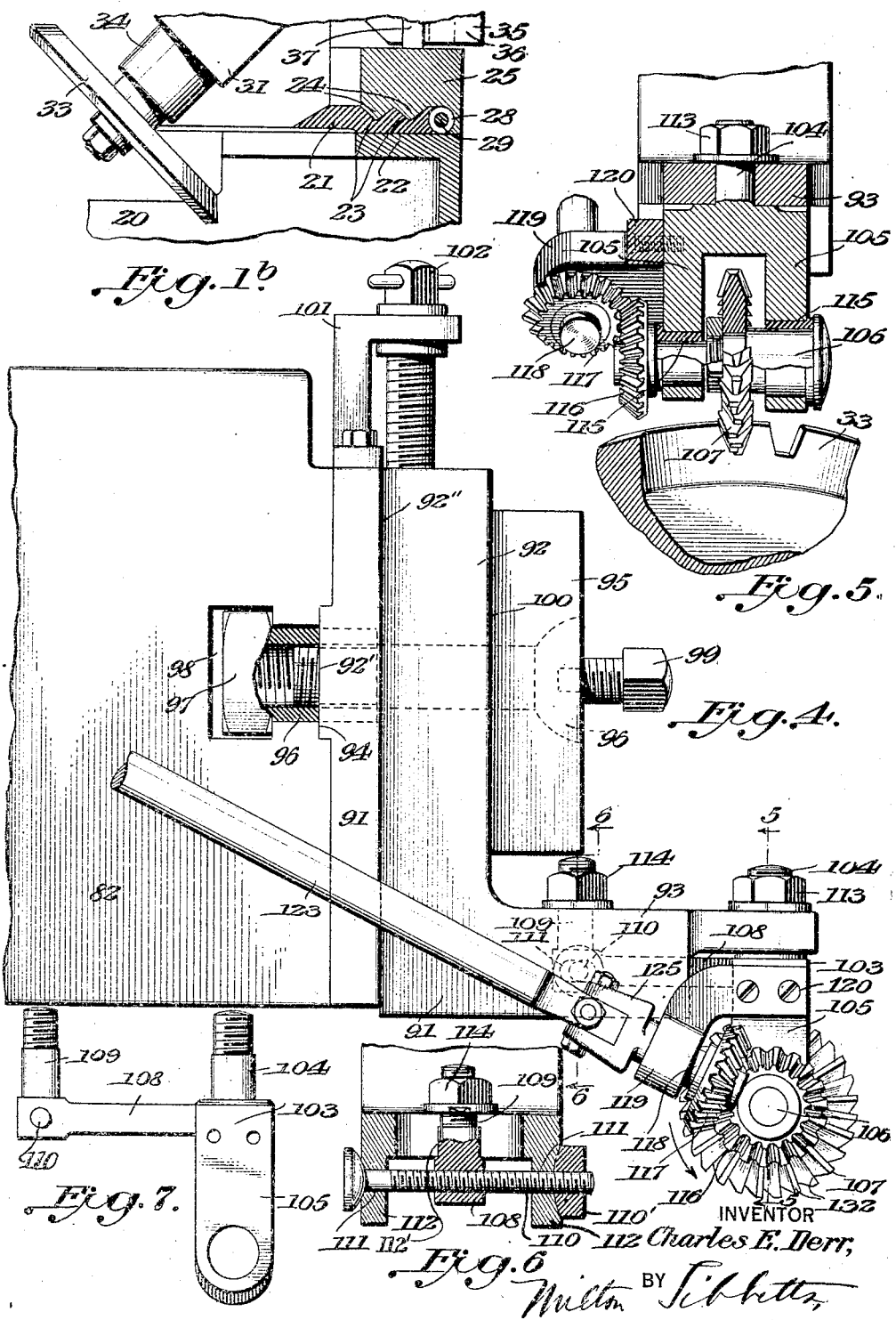

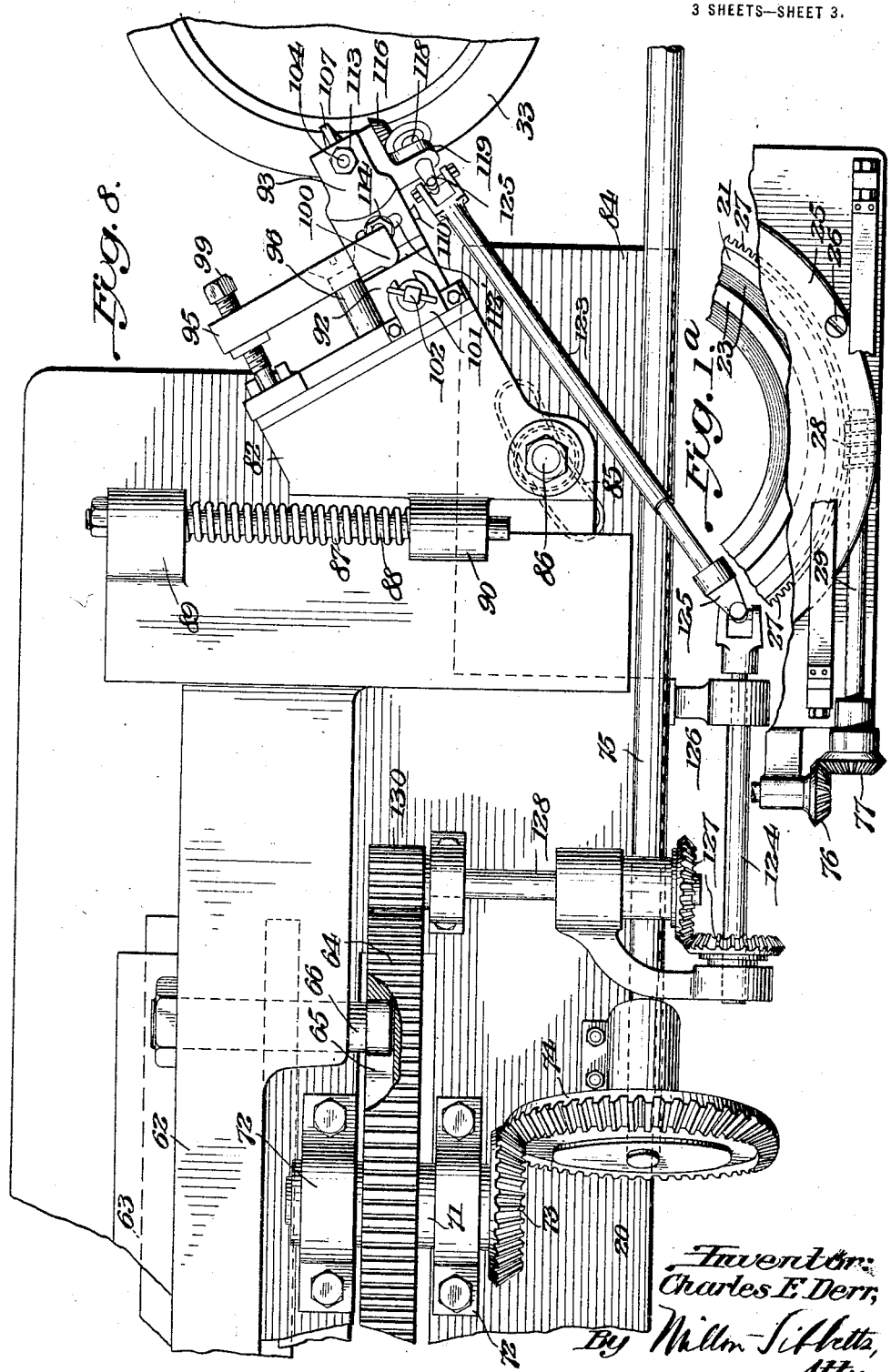

CHARLES E. DERR, OF DETROIT, MICHIGAN, ASSIGNOR, BY MESNE ASSIGNMENTS, TO JAMES E. GLEASON, TRUSTEE, OF ROCHESTER, NEW YORK.

GEAR-CUTTING MACHINE.

1,339,921.   Specification of Letters Patent.   Patented May 11, 1920.

Original application filed June 14, 1915, Serial No. 34,044. Divided and this application filed June 21, 1917. Serial No. 176,173.

*To all whom it may concern:*

Be it known that I, CHARLES E. DERR, a citizen of the United States, and resident of Detroit, Wayne county, State of Michigan, have invented certain new and useful Improvements in Gear-Cutting Machines, of which the following is a specification.

This application is a division of application Serial No. 34,044, filed June 14, 1915, which has resulted in the grant of Letters Patent No. 1,283,693 issued November 5th, 1918.

The invention disclosed herein relates to machines for cutting gears, and particularly bevel gears, and has for its salient object to provide a machine that will cut tooth faces rapidly, smoothly and accurately.

In the embodiments of the invention herein shown a comparatively small rotary cutter or tool is used, the cutter having radially arranged cutting edges of substantially rack tooth form. The cutter is rotated about its axis and fed into the blank, and the latter is rolled on its pitch surface for the purpose of generating the well known involute tooth form, and it is also rotated tooth by tooth in time with the feeding movement of the cutter.

One object of the invention is to provide a single means for controlling all the various movements of the cutter and blank above specified.

The above and other objects of the invention will appear from the following detail description taken in connection with the drawings which form a part of this specification, and in which:—

Figure 1 is a side elevation of a machine embodying the invention;

Fig. 1ª is a plan view of the extreme right hand end of the machine with the blank supporting and indexing means removed;

Fig. 1ᵇ is a vertical sectional view of the right hand end of the machine;

Figs. 2 and 3 are detail views of the blank indexing mechanism;

Fig. 4 is a more enlarged side elevation of the cutter carrier and the means for rotating the cutter;

Fig. 5 is a vertical section substantially on the line 5—5 of Fig. 4, parts being shown in elevation;

Fig. 6 is a section on the line 6—6 of Fig. 4;

Fig. 7 is a detail side view of the cutter holder; and

Fig. 8 is a plan view showing the driving mechanism for the cutter.

Referring to the drawings, the frame or bed of the machine is indicated at 20, and upon the right hand end of the frame, as shown in Fig. 1, is mounted the means for supporting and operating the gear blank. Referring to said Fig. 1 and to Figs. 1ª and 1ᵇ, it will be seen that this supporting means consists principally of a plate 21 mounted upon a flat upper surface 22 of the frame, and having a series of circular grooves 23 in which fit the corresponding circular flanges 24 of a securing plate 25, which is fastened to the frame by the screws 26. The circumference of the plate 21 is formed with gear teeth 27, with which meshes a worm 28 driven by a shaft 29, whereby the plate 21 is rotated or oscillated about a vertical axis which passes through the apex of the former-cone, hereinafter described.

The plate 21 carries two uprights 30 between which is adjustably held a block or bearing 31, as by bolts 32.

The blank 33 is removably clamped to the arbor 34 which operates in the bearing 31, and upon the upper end of the arbor is rotatably mounted the housing 35 of the spacing head, the lower part of this housing comprising the former-cone 36, which is a production of the pitch cone of the blank 33. By means of two steel bands 37, each of which has one end attached to the cone 36 and the other to the body of the machine in such a way that one band prevents the slipping of the cone in one direction and the other in the other direction, the said cone is so held that when the grooved plate 21 is oscillated, the cone will assume a motion as of a cone rolling on a plane without slip. If the housing 35, of which the said cone is a part, were coupled to the blank arbor 34, this rolling motion would be transmitted to the blank 33, thereby imparting to the latter that motion which is necessary to cause the tool to generate the proper tooth contour. It will be understood that the inclined axis of the arbor 34 intersects the vertical axis about which the plate 21 is oscillated.

As a matter of fact, however, the housing 35 is only intermittently coupled to the arbor 34—namely during the cutting stroke or strokes of the cutter. During a period in which the cutter or tool is not cutting, the blank arbor is rotated in relation to the housing 35 through the distance, preferably, of one tooth of the blank 33. This intermittent rotation is accomplished as follows:—Within the housing 35 is rotatably mounted a worm wheel 38 shown in Fig. 2, which worm wheel is driven by means of a worm 39, operated by a flexible shaft 40 (see Figs. 1, 2 and 3), from the cutter operating mechanism and in timed relation therewith, so that the worm wheel 38 will make one-half of a revolution for every full forward and back movement of the cutter.

The face of the worm wheel 38 is provided with two rollers 41 and 42, which engage with two grooves 43 and 44, planed at right angles to each other into the face of a wheel 45. As the worm wheel 38 is rotated one of the rollers will enter a groove in the wheel 45 and impart to it a rotary movement of an accelerating nature. When the worm wheel reaches the position shown in Fig. 2 it has completed one-eighth of a rotation after the roller 41 has entered the groove 43, and has imparted to wheel 45 one-eighth of a revolution, the rate of motion or speed of the wheel 45 being now at its maximum. As the worm wheel 38 completes another one-eighth of a revolution, the movement imparted to the wheel 45 will be of a retarding nature. At this time the groove 43 of the wheel 45 will arrive at the position which the groove 44 assumed when the roller 41 entered the groove 43, and the roller 41 will leave the groove. During the next quarter turn of the worm wheel 38, the wheel 45 will remain stationary until the first semi-revolution of the worm wheel has been completed and the rollers 41 and 42 have exchanged their positions. The roller 42 will then enter the groove 44, and the process described above will be repeated. In this way, an intermittent motion is imparted to the wheel 45, which is so timed that a quarter rotation occurs during a period of rest or inaction of the cutting tool, while the wheel 45 will remain at rest during the cutting period of said tool. The wheel 45 is secured to an arbor 46, to which is clamped a change-wheel 47, Fig. 3. This wheel is geared through an idler 48 to the change-wheel 49, which is clamped to an arbor 50, upon which is also secured a spacing pinion 53. This pinion 53 engages with the master wheel 54, which is secured to the blank arbor 34. Thus the train of gears just described connects the groove wheel 45 with the blank arbor 34. The change-gears are preferably so selected that for each quarter revolution of the wheel 45, the blank 33 is rotated through the space of one tooth.

For holding the blank firmly during the cutting period of the cutter, an anchor is provided as follows:—

To the arbor 55 of the worm wheel 38, is secured a cam 56, Fig. 3, which engages with the cam roller 57 of the anchor lever 58, the spring 59 holding the roller in contact with the cam. The lever 58 carries the anchor toe 60, engaging with the notched anchor-wheel 61, which is clamped to the pinion arbor 50. The cam 56 is so timed that the wheel 61 will be anchored during the cutting period of the cutter and released during the idle or non-cutting period, these periods being more fully hereinafter described.

Upon the left hand end of the frame 20, as shown in Fig. 1 of the drawings, the mechanism for operating the cutter or tool is mounted. A ram 62 is arranged to slide in ways 63 on the frame of the machine, and is reciprocated by means of a wheel 64 having a cam slot 65 operating upon a pin 66 on the ram. The wheel has peripheral gear teeth and is turned by a pinion 67 which is rotated by any suitable source of power through shaft 68, pulley 69 and belt 70. The shaft 71 of the wheel 64 is mounted on the frame in suitable bearings 72 and a bevel gear 73 on said shaft meshes with a gear 74 and drives a shaft 75, which in turn, through bevel gears 76 and 77 drives the shaft 29 for operating the mechanism for rolling the blank on its pitch surface during the cutting operation, as hereinabove described. Also the gear wheel 64 meshes with a pinion 78 mounted in a bracket 79 and connected to operate the flexible shaft 40 hereinabove referred to.

The ram 62 is formed with a head 80 in the front face of which there is a dovetail groove 81. A carrier 82 for the cutter or tool is supported on the head 80 and has a dovetail 83 fitting the groove 81 whereby it may slide laterally as the ram is reciprocated. Suitably supported on the bed of the machine, and shown as beneath the carrier 82, is a cam plate 84 having a cam slot 85 which guides a pin or roller 86 projecting downwardly from the carrier. Thus the carrier is guided laterally as the ram moves forwardly and back, and as the slot is shown as circular or arc shape in form the carrier will be given a movement of translation in a circular arc as it is moved by the ram. A coil spring 87 on a rod 88 is arranged between a lug 89 on the head 80 and an alined lug 90 on the carrier 82 for the purpose of yieldingly holding the roller 86 against one side of the cam slot 85 and thereby taking up any backlash that may be present and promoting a smoother movement of the carrier.

An adjustable bracket 91 is mounted on the carrier 82 and affords a support for the cutter holder hereinafter described. This bracket 91 is substantially L-shaped, having an upright body portion 92 and a forwardly extending portion 93. It is formed with a horizontal rib 92′ which slides in a groove 94 in the front face of the carrier, and it is clamped to the carrier in adjusted position by means of a clamping plate 95 which has a two-part bolt 96, the square head 97 of which enters the T-slot 98 in the carrier, and a tightening bolt 99 which clamps the part 100 of the plate 95 against the bracket. Thus the bolt 99 may be unscrewed sufficiently to free the bracket and the latter adjusted laterally the desired amount, and then the bolt may be tightened to secure the bracket in adjusted position. If desired the upright part 92 of the bracket may be made in two parts for effecting a vertical adjustment of the cutter. Thus the part 92 may be divided along the line 92″, a cleat 101 mounted on one of the parts, and a hand screw 102 used to vertically adjust the one part relative to the other, the clamp 95 being loosened to permit the adjustment and afterward tightened.

A cutter holder 103, shown in detail in Fig. 7 has a substantially vertical spindle 104 which is mounted in the front end of the forward extension 93 of the bracket 91. It also has two spaced, downwardly extending arms 105 which form bearings for the spindle 106 of the rotary cutter 107, and a rearwardly extending tail piece 108 having an upright bolt end 109. The holder therefore, is pivotally supported in the bracket 91 in line with the axis about which the cutter rotates, and it may be adjusted about the axis of its spindle 104 by moving the tail piece, this being accomplished by a screw-bolt 110 passing laterally through the tail piece and through slots 111 in flanges 112 of the forward extension 93. It will be seen that the bolt end 109 operates in a slot 112′ in said extension so that the tail piece may be shifted laterally by said screw-bolt 110 to secure the desired angle of cutting edge to the path of travel of the cutter, and when properly adjusted the holder 103 may be clamped in position by nuts 113 and 114 on the protruding ends of the spindle 104 and bolt end 109, respectively. A nut 110′ on the end of the screw-bolt 110 holds the latter after adjustment.

The spindle 106 of the cutter, is mounted in suitable bushings 115 in the arms 105, and is provided with a bevel gear 116 which meshes with a similar gear 117 on a shaft 118, mounted in a cleat or bracket 119 secured to the side of the holder 103 as by screws 120. The shaft 118 and consequently the cutter 107 are adapted to be driven by the gear wheel 64 which also operates the other parts of the machine. To permit the ready adjustment of the holder 103 on the carrier, the driving connection is through a flexible shaft 123 the middle part of which is extensible and connected to the shaft 118 and a short shaft 124 respectively through universal joints 125. The shaft 124 is mounted in brackets on the frame of the machine and driven by the gear wheel 64 through the pinion 130 shaft 128 and bevel gears 127.

The circular or rotary cutter 107 has radially arranged cutting edges 132 of substantially rack tooth form, the cutter shown having its edges staggered so that each of the edges on one side of the cutter is spaced circumferentially between two edges on the other side thereof. Thus the edges on opposite sides of the cutter operate alternately. By referring to the cutting edges 132 as radially arranged, I mean that they range away from the axis of the cutter spindle 106, so that the tip of each cutter tooth is at the outermost part of the cutter, or farthest from said axis, and such tip faces outwardly, that is to say, away from the cutter axis, and transversely thereof. It will be evident that if the cutter were fed through a gear blank while the latter remained stationary, a V-shaped groove or tooth space would be cut in the blank, but when the blank is rolled on its surface under the cutter during its operation, as by the mechanism hereinabove described, the cut out tooth space leaves tooth faces of involute form. The rapid rotation of the cutter permits small chips to be taken and consequently a very smooth and accurate tooth face is produced.

It will be seen also that this form of cutter lends itself well to the formation of curved or indirect teeth, the term indirect being used in the sense of devious or not straight as this machine may be used to cut teeth which cannot be clearly described as either straight or curved, as for example, herringbone teeth. In Fig. 8 of the drawings the cam slot 85 is of arc shape and arranged diagonally with reference to the path of travel of the ram, causing the cutter therefore, to describe a curved path in a generally diagonal direction across the face of the blank.

The operation of the machine may be described as follows: When the pulley 69 is put in operation a reciprocating motion is imparted to the ram 62 by means of the cam slot 65 and pin 66, the shape of the slot being such that the ram is practically at rest during a part of the revolution of the wheel 64, then advances at a substantially uniform speed until its reaches the limit of its outstroke, then retreats in the same manner to the limit of its instroke where it rests and the operation is repeated. It will be understood that the indexing mechanism shown in Figs. 1, 2 and 3 holds the blank 33 firmly during the forward and return movement of the ram while the cutter is operating on the blank, and that it rotates the blank about its axis preferably one tooth space while the ram is in a state of rest. Also, with the forward movement of the ram, the carrier 82 moves forwardly, guided however, by the cam slot 85 which gives it a lateral movement resulting in a movement of translation in a curved path, as described above. The entire carrier mechanism, including the cutter, partakes of this translatory path of movement, and the cutter therefore, as it rapidly revolves, is fed into the blank and cuts a tooth space therein. Owing to the translatory movement described, the cutter does not rotate constantly in the same plane, but said plane of rotation, while remaining parallel to its original position, is shifted continually in a lateral direction during said translatory movement. Simultaneously with the feeding of the cutter is the rolling of the blank carried on slowly, as above described, so that each following feeding stroke of the carrier will cause the cutter to cut slightly deeper than the one preceding, and after the blank has made one revolution on its own axis, and the cutter has made the first cut into each space of the blank, it will make a second cut into the first space somewhat deeper than the first cut. This process will continue during the complete rolling action of the blank or until it has proceeded so far that the cutter ceases to cut.

If a bevel gear is being cut, this first operation correctly generates an involute tooth face on only one side of each tooth space of the blank, and in order to obtain the convergent space peculiar to bevel gears, both the cutter and the blank are than readjusted in the usual manner for the second operation that will generate the other tooth face of the tooth spaces.

The operation of adjusting the various parts of the machine will be understood, it is believed, from the detail description above.

Having thus described my invention, what I claim and desire to secure by Letters Patent is:—

1. In a gear cutting machine, the combination with means for holding the blank and for rolling it so that the position of its axis will change, of a rotary cutter, a carrier therefor, means for moving the carrier across the face of the blank to feed the cutter, and means operated by a moving part of the machine for rotating the cutter.

2. In a gear cutting machine, the combination with means for holding the blank and for rolling it so that the position of its axis will change, of a rotary cutter, a carrier therefor, means for moving the carrier across the face of the blank to feed the cutter, and means operated by the carrier moving means for rotating the cutter.

3. In a gear cutting machine, the combination with a blank holding means, a rotary cutter, a carrier for the cutter, means for relatively rolling the blank and cutter, and means for moving the cutter carrier across the face of the blank to feed the cutter, of means operated by a moving part of the machine for rotating the cutter as it is moved across the face of the blank by the aforesaid other means.

4. In a gear cutting machine, the combination with a blank holding means, a rotary cutter, a carrier for the cutter, means for relatively rolling the blank and cutter, and a rotary device and connections for moving the cutter carrier across the face of the blank to feed the cutter, of means operated by said rotary device for rotating the cutter as it is moved across the face of the blank by the aforesaid other means.

5. In a gear cutting machine, a blank holding means, a rotary cutter, a carrier for said cutter, means for relatively rolling the blank and cutter, means for moving the cutter carrier across the face of the blank in a direction transverse to the plane of rotation of the cutter so as to cause said plane of rotation to shift laterally as the cutter is moved across the face of the blank by said movement of the cutter carrier, and means, operated by a moving part of the machine, for rotating said cutter as it is moved across the face of the blank by the aforesaid other means.

6. In a gear cutting machine, a blank holding means, a rotary cutter having radial cutting edges, a carrier for said cutter, means for relatively rolling the blank and the cutter, means for moving the cutter carrier across the face of the blank in a direction transverse to the cutter axis, and means, operated by a moving part of the machine, for rotating said cutter as it is moved across the face of the blank by the aforesaid other means.

7. In a gear cutting machine, a blank holding means, a rotary cutter having cutting tips facing away from the cutter axis, a carrier for said cutter, means for relatively rolling the blank and the cutter, means for moving the cutter carrier across the face of the blank in a direction transverse to the cutter axis and also transverse to the tooth-zone of the blank, so as to shift the cutter axis gradually from a position adjacent one end of the cut or tooth-space, to a position at the other end of such tooth-space of the blank, and means, operated by a moving part of the machine, for rotating said cutter as its axis is shifted lengthwise of said cut or tooth-space of the blank by the aforesaid movement of the cutter carrier across the face of the blank.

In testimony whereof I affix my signature.

CHARLES E. DERR.